US009111467B2

(12) United States Patent
Paavilainen et al.

(10) Patent No.: US 9,111,467 B2
(45) Date of Patent: Aug. 18, 2015

(54) SEALING SYSTEM FOR SEALING OF DOORS OF TRANSPORT VEHICLES WITH DOOR SPECIFIC SEALS

(75) Inventors: Samuli Paavilainen, Turku (FI); Jussi Lemola, Espoo (FI)

(73) Assignee: Deutsche Post AG, Bonn (DE)

( * ) Notice: Subject to any disclaimer, the term of this patent is extended or adjusted under 35 U.S.C. 154(b) by 0 days.

(21) Appl. No.: 13/636,105

(22) PCT Filed: Mar. 16, 2011

(86) PCT No.: PCT/EP2011/001288

§ 371 (c)(1),
(2), (4) Date: Sep. 19, 2012

(87) PCT Pub. No.: WO2011/120635

PCT Pub. Date: Oct. 6, 2011

(65) Prior Publication Data

US 2013/0008087 A1 Jan. 10, 2013

(30) Foreign Application Priority Data

Mar. 29, 2010 (EP) .................................... 10158157

(51) Int. Cl.
*G06F 3/03* (2006.01)
*G09F 3/03* (2006.01)

(52) U.S. Cl.
CPC ........................................ *G09F 3/03* (2013.01)

(58) Field of Classification Search
CPC ....... G09F 3/0329; G09F 3/03; G09F 3/0305; G09F 3/00
USPC .............. 49/13, 14, 65, 67; 244/129.4, 129.5; 292/307 R, 307 B
See application file for complete search history.

(56) References Cited

U.S. PATENT DOCUMENTS

| | | | | | |
|---|---|---|---|---|---|
| 521,239 | A | * | 6/1894 | Hoopes | 200/61.68 |
| 3,714,644 | A | * | 1/1973 | Hellstrom | 340/508 |
| 4,233,595 | A | * | 11/1980 | Landkammer | 340/542 |
| 4,587,517 | A | * | 5/1986 | Engstrom et al. | 340/542 |
| 4,937,556 | A | * | 6/1990 | Scott et al. | 340/686.1 |
| 5,097,253 | A | * | 3/1992 | Eschbach et al. | 340/545.1 |
| 5,392,025 | A | * | 2/1995 | Figh et al. | 340/547 |
| 5,400,246 | A | * | 3/1995 | Wilson et al. | 700/17 |
| 5,447,344 | A | * | 9/1995 | Hayward | 292/246 |

(Continued)

OTHER PUBLICATIONS

International Search Report, dated Aug. 17, 2011 (English).

(Continued)

*Primary Examiner* — Katherine Mitchell
*Assistant Examiner* — Shiref Mekhaeil
(74) *Attorney, Agent, or Firm* — International IP Law Group, PLLC

(57) ABSTRACT

Provided is a sealing system for sealing of doors of transport vehicles comprising at least one door with at least one first electrical contact and a corresponding door frame with at least one second electrical contact, where the first and the second contact are arranged on the same side of the door and the door frame and are electrically connected to build an open electrical circuit, and a seal to be attached to the closed door and the door frame suitable to close the open electrical circuit between first and second electrical contact in order to indicate the closure of the door. Additionally provided is a portable logging device for recording the sealing of doors as used by the sealing system and to a method to operate such a sealing system.

17 Claims, 4 Drawing Sheets

(56) References Cited

U.S. PATENT DOCUMENTS

| | | | | |
|---|---|---|---|---|
| 5,519,878 | A * | 5/1996 | Dolin, Jr. | 709/220 |
| 5,877,685 | A * | 3/1999 | Eriksson | 340/545.1 |
| 6,265,973 | B1 * | 7/2001 | Brammall et al. | 340/568.1 |
| 6,281,793 | B1 * | 8/2001 | Haimovich et al. | 340/545.1 |
| 7,164,360 | B2 * | 1/2007 | Schiebler | 340/572.9 |
| 7,344,109 | B1 * | 3/2008 | Rezai | 244/118.2 |
| 7,350,748 | B2 * | 4/2008 | Matos | 244/76 R |
| 7,411,495 | B2 * | 8/2008 | Auerbach et al. | 340/539.26 |
| 7,595,727 | B2 * | 9/2009 | Grijalva et al. | 340/545.1 |
| 7,740,292 | B1 * | 6/2010 | Fattori et al. | 292/307 R |
| 2003/0229474 | A1 * | 12/2003 | Suzuki et al. | 702/188 |
| 2004/0041705 | A1 * | 3/2004 | Auerbach et al. | 340/539.22 |
| 2004/0189471 | A1 * | 9/2004 | Ciarcia et al. | 340/572.1 |
| 2004/0227632 | A1 | 11/2004 | Grijalva et al. | |
| 2005/0231365 | A1 * | 10/2005 | Tester et al. | 340/568.1 |
| 2006/0103524 | A1 * | 5/2006 | Auerbach et al. | 340/545.6 |
| 2006/0202825 | A1 | 9/2006 | Rajapakse et al. | |
| 2006/0250235 | A1 * | 11/2006 | Astrin | 340/539.22 |
| 2007/0046459 | A1 * | 3/2007 | Silverman et al. | 340/539.13 |
| 2007/0112939 | A1 * | 5/2007 | Wilson et al. | 709/219 |
| 2007/0120381 | A1 * | 5/2007 | Ehrensvard et al. | 292/307 R |
| 2007/0222232 | A1 * | 9/2007 | Held | 292/307 R |
| 2008/0016805 | A1 * | 1/2008 | Walter | 52/263 |
| 2008/0297346 | A1 * | 12/2008 | Brackmann et al. | 340/572.1 |
| 2008/0309487 | A1 * | 12/2008 | Chao | 340/542 |
| 2009/0066503 | A1 * | 3/2009 | Lin | 340/539.13 |
| 2009/0108597 | A1 * | 4/2009 | Terry et al. | 292/327 |
| 2009/0112638 | A1 * | 4/2009 | Kneller et al. | 705/5 |
| 2009/0248366 | A1 * | 10/2009 | Scheid et al. | 702/188 |
| 2011/0258930 | A1 * | 10/2011 | Francis et al. | 49/14 |
| 2012/0225726 | A1 * | 9/2012 | Anderson et al. | 463/42 |
| 2014/0068486 | A1 * | 3/2014 | Sellers et al. | 715/771 |
| 2014/0226851 | A1 * | 8/2014 | Alberth et al. | 382/103 |

OTHER PUBLICATIONS

International Preliminary Report on Patentability, dated Apr. 4, 2012 (English).

* cited by examiner

SEALING SYSTEM FOR SEALING OF DOORS OF TRANSPORT VEHICLES WITH DOOR SPECIFIC SEALS

CROSS-REFERENCE TO RELATED APPLICATIONS

Pursuant to 35 U.S.C. §371, this application is the U.S. National Stage Application of International Patent Application No. PCT/EP2011/001288, filed on Mar. 16, 2011, the contents of which are incorporated by reference as if set forth in their entirety herein, which claims priority to European (EP) Patent Application No. 10158157.7, filed Mar. 29, 2010, the contents of which are incorporated by reference as if set forth in their entirety herein.

BACKGROUND OF THE INVENTION

The doors of a transport vehicle are often sealed after closure of the doors during a checking procedure (clearance) for this transport vehicle with a seal applied to each of the doors. The seals provide visual indications that the doors are closed at a certain point of time and not have been opened later on. In logistic centers, seals may be applied to doors of trucks, train wagons etc. to provide a visible sign to the receiving center, that the transport vehicle (at least the storage volume for the transported freight) was not opened during transport in case of unbroken seals. The seals prevent undetected and unauthorized opening of doors to secure the freight loaded to the transport vehicle. In other cases, the sealing procedure is part of a release procedure for transports with higher security standards. As an example, aircraft are released for being allowed to leave the airport. Open doors during take-off and during the flight are a safety problem. Therefore, all doors of the aircraft are closed and checked before releasing the aircraft for taking-off (clearance). Currently, one or more airport employees visually check all doors of each aircraft and attach adhesive tape across each closed door at the outer side. The adhesive tape provides a visual indication that the particular door is checked and closed. In parallel, the airport employee fills out a paper check list to record in writing the executed check procedure. After completing the check procedure, the paper check lists are archived. The airport provides an adapted check list per aircraft type, since the number and the location of doors differs between different aircraft types, which involve a resource-intensive administrative effort. Furthermore, to find the location of all doors can be difficult for some aircraft types because the checking procedure does not support the finding of doors. Already checked doors with attached tape might be opened later. Re-opened doors may eventually stay open unnoticed. The checking procedure is time-consuming Eventual doubts about the correct execution of the check procedure may involve a repeated second check procedure leading to time delays in the clearance of aircraft for subsequent take-off. The listed disadvantages also apply to other transport vehicles.

SUMMARY

The subject innovation relates to a sealing system for sealing of doors of transport vehicles with door specific seals, a portable logging device used by the system and to a method to operate such a system.

The term "open electrical circuit" denotes a conductive connection between two points, here the first and second electrical contact, with no return path for the current, also called as not-closed loop. The contrary to the open electrical circuit is a closed electrical circuit or a closed loop giving a return path for the current. The seal according to the present invention provides a visual indication that the particular door is checked and closed. The seal provides a closed electrical circuit indicating electronically a correct sealed door and any re-opening of the door results in a broken electrical circuit formally being closed and subsequently detected by the changed electrical properties of the electrical circuit. The seal according to the subject innovation enables a double security check of sealed doors: (a) visually, by the present seal, and (b) electronically, by the closed electrical circuit, which the seal is a part of. Therefore, the seal according to the subject innovation improves the security of the transported freight and the transport vehicle. In case of re-opened doors, the freight of the transport vehicle can be checked again to detect any burglary, and additionally, any security risk to operate the transport vehicle can be avoided. Furthermore, in case of any doubts, whether a door might be re-opened or not, the status of the initially closed electrical circuit provides a secure prove of the history happening to the door. If the closed electrical circuit is not broken, there was no re-opening of the door. Therefore, a time-consuming second check can be avoided, preventing time delays in the clearance of transport vehicles, e. g. aircraft for subsequent take-off. A seal that is simply attachable to the door and the area around the door is easy to handle. Attaching a seal to a door is referred to herein as a sealing procedure, which commonly is executed by a security operator.

In the context of the subject innovation, transport vehicles denote any transport vehicle or components of the transport vehicles suitable for applying the seal. The term, "transport vehicles," includes trucks, cars, train wagons, ships, container for container trucks, aircraft such as airplanes, helicopters, etc. The term, "doors," includes any opening, which can be closed and re-opened such as, conventional doors (e.g., doors of trucks, cars, and aircraft), scuttles, portholes, hatchways, tailboards, etc. The term, "door frame," denotes any area of the transport vehicle surrounding the door, where the door is mounted.

The first and second electrical contact may be any suitable means allowing electrical contact with corresponding parts of a seal. The material of the first and second electrical contact is conductive, for example, a metal layer, a metal plate or a recess or hole with electrical contacts inside. The shapes of the first and second electrical contact may be identical. In other embodiments, the first electrical contact may be shaped differently compared to the second electrical contact. With a corresponding seal having contact areas to be connected to the first and second electrical contact, which are shaped differently and adapted to the shape of the first and second electrical contact, the position of the seal is defined with respect to the first and second electrical contact. This could be advantageous in case of seals comprising electrical components, where a certain current direction is predetermined. For example, the first electrical contact connected to the negative pole of a power supply has a first shape and the second electrical contact connected to the positive pole of the power supply has a second shape different to the first shape, where the first and second conductive areas are shaped in accordance to the shape of the first and second electrical contact. The connection between both electrical contact can be established by a wire or any other suitable conductive connection.

An attachable seal denotes any seal, which enables the fixation of the seal at a certain position on the door and the door frame, in particular on the surface of the door and on the surface of the door frame, in order to electrically connect the first and second electrical contact via the seal. The attachable seal might be glued, clamped, adhesive attached or otherwise fixed at its desired position. The surface of the door or the door frame can be the outer surface (e.g. in case of doors of aircraft etc.) or for other purposes the inner surface of the door and the wall of a transport vehicle. In case of doors without a particular frame, the door frame according to the subject innovation is established by the area around the door. In case of double wing doors, the seal might be attached over both wings of the door, where the wing closed first is denoted as the door frame, while the other door wing closed later is denoted as the door. Alternatively, double wing doors might be sealed by applying one seal according to the present invention for each wing of the double wing door. In this case, the seal can be applied onto each of the doors and onto the frame around the double wing doors.

The term, "to indicate the sealing," may denote any suitable electrical parameter (e.g. via resistance or capacitance), which value indicates whether the electrical circuit is open, closed or broken (re-opened) after closing it with the seal. An electrical parameter corresponding to a closed electrical circuit indicates that this door is checked and closed and that the door was not opened again after checking the door. Additionally, any visual inspection also shows, whether the seal is present and undamaged.

The term, "seal," denotes a seal of any shape which can be attached to a door. The seal may be made of a piece of material such as rubber, metal or plastic or combinations thereof, with further embedded components. The seal may comprise a combination of elastic and inelastic materials. The seal may comprise elastic components or elastic parts of the seal in order to be usable for different kind of doors having different shapes and sizes. The material of the seal comprise electrical wires and/or electrically conductive layers and/or conductive plates arranged at least partly at the surface of the seal in order to be connected to the first and second electrical contact.

In an embodiment, an indicator is arranged within the closed electrical circuit, arranged in or on the seal, and being activated after closing the electrical circuit by closing the open electrical circuit, to detect a break of the closed electrical circuit during the activated status of the indicator. The activation of the indicator denotes the action to start a control procedure, where the indicator recognizes a change of the electrical properties of the electrical circuit to a value significant for a broken electrical circuit, which corresponds to a re-opening of the door after sealing this door. For example, the indicator can be activated manually via a switch automatically activated after closing the open electrical circuit, or via an external signal. In case of activating the seal with a switch, the indicator are accessible for an operator performing the sealing procedure, e.g., with indicator arranged in or on the seal. The sealing procedure is the procedure where the seals are attached to the doors and door frames in order to seal the doors. The activation starts a continuous or periodic measurement of a certain parameter, where the value of the parameter corresponds to the status of the electrical circuit (open, closed or broken after formally being closed), e.g., the resistance, the capacity value, or any other suitable parameter of the electrical circuit. Depending on the embodiment of the indicator, the activation of the indicator might be reversible or non-reversible. In case of non-reversible activation, the system is used for finally sealing a door. An indicator able to be de-activated by authorized people enables a reversible sealing procedure. However, the indicator may not be de-activated by non-authorized persons. This could be achieved by a suitable positioning of the indicator at a place not accessible after completing the sealing procedure, e.g., at the outside of aircraft when the doors can only be re-opened from the inside of the aircraft. However, it is advantageous if the de-activation is limited to authorized persons, e.g., by an identification procedure that authorized people perform before being able to de-activate the seal. The indicator may be arranged inside the seal.

In an embodiment of the sealing system, a power supply is arranged within the closed electrical circuit in order to operate at least the indicator. The power supply can be any suitable power supply, e.g. a battery to allow a low voltage driving of the components of the closed electrical circuit, e.g., the indicator and other components such as a light source (e.g. a LED) indicating the activation of the indicator. Such a light source may be arranged at the seal or at any other suitable place near the closed electrical circuit and/or the seal. A light source enables a fast check of a successful activation of the indicator corresponding to a correct sealing of the door, especially during night. In an embodiment, the power supply may be arranged as part of the seal. The advantage of a seal carrying the power source, e.g., a rechargeable battery, to operate the electrical circuit, the indicator, is the possibility to exchange and/or recharge the battery separate from the door and the door frame before attaching the seal to the first and second electrical contact. This proves a maintained power supply ready for use when sealing the door.

In another embodiment the indicator includes a sender, such as a RFID chip, suitable to send out a warning signal, including a code suitable to identify the location of the sealed door, as response to the detected break of the closed electrical circuit. In case of re-opening of the door, the sent-out warning signal could be any type of warning signals suitable of being recognized by either a control system, e.g. a computer system, and/or people who are present. There are very small and/or flat chips available as senders on the market today that are suitable to be integrated into the closed electrical circuit, e.g., located in the door, the door frame, or in the seal. An additional antenna can be arranged, for example, as a flat antenna. As an example, RFID transponders (RFID chips) are able to provide signals with an operating distance up to 100 m. The indicator including an RFID chip may be activated (=activation of the closed electrical circuit) by receiving an external activation signal, for example provided by the portable logging device. The power, e.g., for active RFID tags, to operate the seal may be received from a flat battery arranged as a component in the closed electrical circuit, for example, embedded in the seal. In one embodiment, the indicator includes a clock to record the time when the break of the closed electrical circuit is detected. The warning signal may include the time when the break was detected. The warning signal may have any suitable format to be able to be received from a receiving station, e.g., having a Bluetooth or Sigsbee format, including the code of the broken seal, together with the time, when the controller detected the break or damage of the seal and/or the formally closed electrical circuit. People skilled in the art may consider other senders. The range of operation depends on transmitting power, frequency and receiver sensitivity.

In an embodiment, the sealing system includes at least one receiving station, possibly multiple receiving stations arranged within a clearance area to receive the warning signal, and an alarm suitable to provide an alarm signal at least inside the clearance area as a response to the received warning signal. The clearance area denotes the area within a logistic terminal or center, where the transport vehicles are located for releasing the vehicles to transport the freight to the desired destination. The freight includes goods of any kind and/or people transported by the transport vehicle. As an example, for aircraft as the transport vehicle, the clearance procedure includes steps and components for permitting the aircraft to take-off. Correspondingly, the clearance area could be the airport terminal, any other parking area for the aircraft, a hall or the entire airport. In case of other transport vehicles, the clearance area might be a logistics center (e.g., for trucks), a harbor, a train station, a switching yard station or other parts of the previously listed areas. Depending on the range of operation of the senders and the size of the clearance area, multiple receiving stations receive an eventual warning signal from any possible location inside the clearance area. The receiving stations may be connected to the computer system via a data connection established by data cables or wireless, applying a data transmission technology with a larger range of operation, or by forwarding the received data from one receiving station to the neighbored receiving stations until the transmitted data can be received by the computer system. The receiving station can be any device suitable to receive the warning signal as a wireless signal, e.g., an antenna. The alarm signal can be a visible, audible signal or a signal provided by the receiver itself (here the receiver is also the alarm), or triggered by a computer system connected to the receiver and the alarm, recognizable for a security operator inside and/or outside the clearance area. For example, the alarm signal may be sent-out by an alarm such as a horn, a loudspeaker, a flashlight or other alarm.

In another embodiment the sealing system includes at least one portable logging device according to the subject innovation to record the sealing of the door with at least a data insert unit to insert a particular type of the transport vehicles, to record an executed attachment of the seal to a certain door and a data unit to store the data as sealing data. The portable logging device replaces any paper check lists to record the executed sealing procedure such as sealing of doors. The sealing procedure of the subject innovation may represent an improvement because the sealing procedure can be executed faster due to avoiding manually filling of forms. Eventual doubts about the correct execution of the check (sealing) procedure can be resolved by checking the recorded sealing data, avoiding a time-consuming second check procedure, which lead to time delays in the clearance of transport vehicles, e.g., aircraft for subsequent take-off. Furthermore, the portable logging device may be used to activate the indicator.

In another embodiment, the indicator or the seal provides a machine-readable code suitable to identify the sealed door and the portable logging device includes a reading unit suitable to read the machine-readable code and to store the machine-readable code as part of the sealing data in the data unit. The machine-readable code is provided as an electromagnetic signal sent-out by a RFID chip as part of the indicator. The operator attaching the seals to the doors does fill in check lists manually to log the sealing procedure, but can log the individual code provided by each indicator corresponding to a certain door where a seal is applied simply by a logging device reading the seal identification. The machine-readable code can be any kind of code able to identify the seal (=to distinguish a particular indicator corresponding to a particular closed electrical circuit and therefore to a particular door from all other indicator arranged at other doors) and to be read by the logging device. Alternatively, the sealed door can be identified by a machine-readable code attached to the seal, e.g. a barcode label applied (glued) to the outer surface of the seal (outer surface=surface facing away from the door).

In another embodiment, the sealing system includes a computer system suitable for receiving and storing the sealing data from the portable logging device. The computer system can be any system suitable to receive, to store and archive the sealing data in order to record any executed sealing procedure. The stored data may be used later in case of doubts of an executed sealing procedure, e.g. in case of lost freight. The sealing data may be received via a data port connected to the computer system by a data cable or received wireless, e.g. by a WLAN connection. The advantage of such a sealing system is the logging of the sealing procedure, the availability of the logged data to any person having a need to know, the archiving of any sealing procedure and the improved security for the transport vehicle and the loaded freight by fast and reliable detection of any non-authorized re-opening of a sealed door.

In another embodiment, the seal includes a first conductive area suitable to be attached to the first electrical contact and a second conductive area electrically connected to the first conductive area suitable to be attached to the second electrical contact in order to close the open electrical circuit. The closed electrical circuit comprises the electrical circuit of first and second electrical contact and the electrical connection between these and the first and second conductive areas and the electrical connection between these areas. As an example, the first and second conductive areas might be connected via a wire arranged inside the seal or via a conductive path at least partly covering the surface of the seal. The shape of the conductive path can be adapted to the particular application within the scope of subject innovation. The electrical contact between first electrical contact and first conductive area and second electrical contact and second conductive area can be established by fixing the seal to the surface of door and door frame, e.g. with an at least partly adhesive surface of the seal surrounding the first and second conductive areas, or any other suitable techniques to fix the seal to door and door frame.

In one embodiment, the first conductive area and the first electrical contact and/or the second conductive area and the second electrical contact form a suitable combination of mechanically fitting parts, the combination may be at least one element of the group of elements including plug and socket, recess and protrusion, metal area and spring mounted protrusion, or metal area and magnetic metal area in order to improve the tightness of the fixation of the seal to door and door frame, resulting in a reliable closure of the electrical circuit indicating the sealing of the door. People skilled in the art may choose appropriate geometrical shapes and material properties of first and second electrical contact and conductive areas to establish reliable closure of the electrical circuit.

The subject innovation further relates to a portable logging device for recording sealing of doors used in the sealing system including a data insert unit to insert a particular type of the transport vehicles, to record an executed attachment of a seal to a certain door, and a data unit suitable to store the data as sealing data, also including a reading unit to read a machine-readable code provided by an identifier, or the seal, and to store the machine-readable code in the data unit, and also including a display unit for displaying the location of each door of the particular type of the transport vehicles where the seal is attached, and for correlating the location of the door with the machine-readable code. In one embodiment, the portable logging device includes a data connection unit suitable to transfer the sealing data to a computer system and/or update the sealing data stored in the data unit, e.g., via a wireless data connection. The portable logging device replaces any paper check lists to record the executed sealing procedure. The sealing procedure can be executed faster due to the avoided manual filling of forms. Eventual doubts about the correct execution of the check procedure can be resolved by checking the recorded sealing data, thereby avoiding a time-consuming second check procedure, which formally led to time delays in the clearance of transport vehicles, e.g., aircraft for subsequent take-off.

The logging device is portable, e.g. as a hand-held device. The data insert unit can be any suitable array of buttons or keys to insert data, e.g. a key board or an array of keys for multiple characters, numbers and/or symbols. The transport vehicles can be different from each other. Even in the same class of transport vehicles, e.g., aircraft, there are many different types of transport vehicles, e.g. small aircraft, large aircraft, aircraft of any size from different manufactures, and having a different number and location of doors. After inserting the type of the transport vehicle, the portable logging device may provide the number of doors to be checked for this particular transport vehicle. Alternatively, the portable logging device may count the inserted executed attachments and compare the number to the expected number of doors to be checked for this particular type of transport vehicle. The inserted data are stored in a suitable data unit, e.g., a memory chip, or a memory card. Other data units are also possible within the scope of subject innovation.

The reading unit may be any suitable reading unit adapted to the provided machine-readable code. In case of a barcode as the machine-readable code, the reading unit is a barcode scanner. If the machine-readable code is coded electronically, the reading unit is an adapted receiver of the sent-out code of the indicator or the seal. This machine-readable code, together with a portable device able to read the code of the identification, or alternatively, of the seal, reduces the time for the sealing procedure. The operator only attaches the seal to the door, and places the portable logging device for a short moment in a suitable position in front of the sealed door in order to record the executed sealing for this door. This action uses a smaller amount of time compared to sealing procedures according to prior art.

The support for the operator to find the doors provided by the display unit is useful because the large number of different types of transport vehicles makes it challenging for the operators executing the sealing procedure to quickly find the doors to be checked. A door that is difficult to be find may lead to a delay in the clearance of a transport vehicle. Furthermore, the operators are not instructed to find doors in beforehand, which would involve a costly administrative effort.

The display unit may be any suitable display of a suitable size to support the operator to find all the doors of the transport vehicle in a limited time period. The location of the doors may be displayed as marker of a displayed lay-out or blueprint of the transport vehicle. The portable device may further include a GPS module in order to provide distance and orientation information to the operators in case of transport vehicles, such as aircraft, ships or trains. The combination of marked doors and distance between the current position of the operator and the next door improves the support to the operator about how to find the next door. The location of the door on the lay-out or blueprint can be correlated to the code of the seal. This correlation decreases the time and effort to check a seal in case of receiving the warning signal from the indicator because the location of the door corresponding to the particular indicator is known.

The data connection unit may be a data port suitable to be inserted in a corresponding reading device connected to the computer system. The wireless connection may be provided by a WLAN system present in the environment of the portable device, where the computer system is connected to. The possibility of transmitting the recorded data via a data connection to a computer system makes archiving of sealing data easier and faster. Eventual doubts about the correct execution of the sealing procedure can be proven by checking the archived sealing data, thereby avoiding a time consuming second sealing procedure.

The subject innovation further relates to a method for operating a sealing system that includes the steps of providing at least one door with at least one first electrical contact and a corresponding door frame with at least one second electrical contact, where the first and the second contact are arranged on the same side of the door and the door frame and are electrically connected to build an open electrical circuit, and closing the open electrical circuit by attaching a seal to the first electrical contact of the door and to the second electrical contact of the door frame in order to indicate the sealing of the door.

In an embodiment, the step of closing the open electrical circuit includes the steps of activating an indicator after or by attaching the seal, and sending out a warning signal by the indicator after detecting a break of the closed electrical circuit during the activated status of the indicator.

Activating the seal can be executed mechanically by an operator, or by attaching the seal to the door via a mechanical switch, electronically by detecting the closure of the formally open electrical circuit, or electronically by an external signal provided from a portable logging device.

In another embodiment, the method includes the steps of receiving the warning signal with at least one receiving station, arranged within a clearance area, and providing an alarm signal at least inside a clearance area as a response of the received warning signal.

The alarm signal can be a visible, audible signal or a signal provided by the computer system to a certain security operator.

In another embodiment, the method includes the steps of inserting a particular type of the transport vehicles into a portable logging device according to the subject innovation, inserting the execution of attaching the seal to a certain door as sealing data into the portable logging device via a data insert unit, such as by reading a machine-readable code provided by an indicator, and storing the inserted sealing data in a data unit of the portable logging device.

receiving and storing the sealing data inserted to the portable logging device from the portable device in a computer system as part of the sealing system, preferably via a wireless data connection.

BRIEF DESCRIPTION OF THE DRAWINGS

These and other aspects of the invention will be apparent from and elucidated with reference to the embodiments described hereinafter.

DETAILED DESCRIPTION OF EMBODIMENTS

Figure 1:
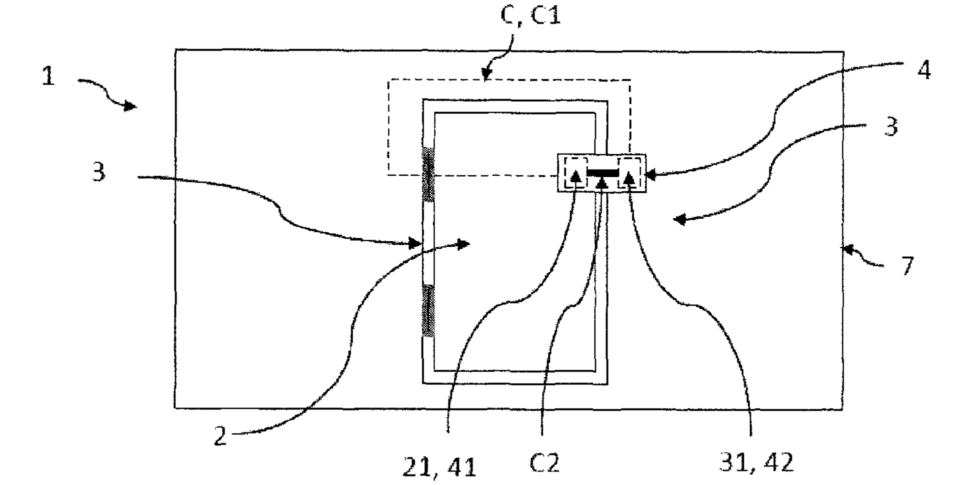
FIG. 1 is a seal system according to the present invention for sealing a door of a transport vehicle.

FIG. 1 shows a seal 4, according to the subject innovation, attached to a door 2 of a transport vehicle 7 in order to seal the door 2. A first conductive area 41 of the seal 4 is attached to the surface of the door 2, where the first electrical contact 21 of the door 2 is located. A second conductive area 42 of the seal 4 is attached to the surface of the door frame 3, where the second electrical contact 31 of the door frame 3 is located. First and second electrical contact 21, 31 and first and second conductive areas 41, 42 are indicated as dashed squares inside the area covered by the seal 4. The black line C2 denotes the electrical connection between the first and the second conductive areas 41, 42 of the seal 4. The electrical connection between the first and second electrical contact 21, 31 is shown as dashed line C1. The electrical connection C1 and C2 establish a closed electrical circuit C indicating the successful sealing of the door 2. The electrical connection C2 (so-called open electrical circuit in case of non-attached seals) can be established by a wire extending from the first electrical connection 21 arranged at the surface of the door 2 through the door 2, the door hinge and the door frame 3 to the second electrical contact 31 arranged at the surface of the door frame 3 at a position close to the position of the first electrical contact 21 of the door 2. The electrical connection C1 is only one example of possible electrical connections C1. People skilled in the art are able to choose other kinds of electrical connections between first and second electrical contact within the scope of this invention. Here the door frame 3 is part of the wall of the transport vehicle 7. The transport vehicle 7 is only indicated schematically. The transport vehicle 7 could be e.g. a truck, a car, a train wagon, a ship, a container for container trucks, an aircraft such as an airplane or a helicopter.

Figure 2:
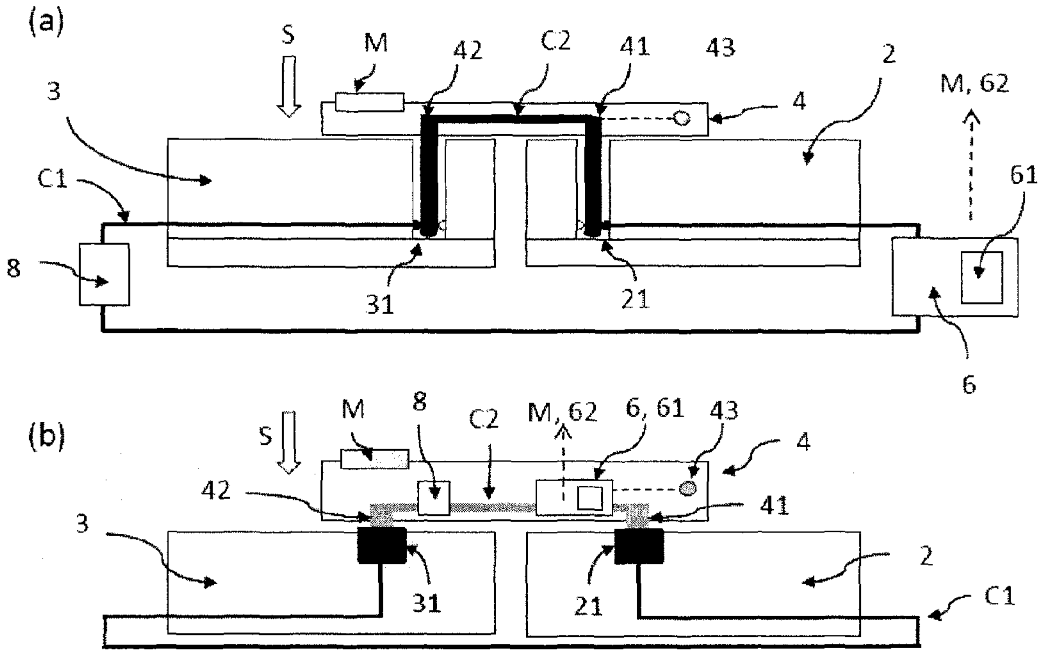
FIG. 2 is a seal attached to door and door frame: (a) first embodiment 1, (b) second embodiment.

FIG. 2 shows two embodiments of a seal 4 attached to the door 2 and the door frame 3. In both cases, the seal 4 includes a first conductive area in an electrical contact to the first electrical contact 21 of the door 2 and further includes a second conductive area 42 in an electrical contact to the second electrical contact 31 of the door frame 3. The electrical connection C1 between the first and second electrical contact 21, 31 via door 2 and door frame 3 (also denoted as open electrical circuit C1 in case of no attached seal 4) and the electrical connection C2 between first and second conductive area 41, 42 of the seal 4 establish a closed electrical circuit C together with first and second electrical contact 21, 31 contacted to the first and second conductive areas 41, 42. In order to provide a seal fixed to the door and the door frame, the geometrical shape of first and second electrical contact 21, 31 and the first and second conductive areas 41, 42 might be adapted to fix the seal 4 to door 2 and door frame 3 in a snug fit manner, as shown as an example in FIG. 2*a*. Here the first and second conductive areas 41, 42 of the seal 4 are arranged as cylindrical parts fitting into the first and second electrical contact 21, 31 arranged as adapted cylindrical holes in door and door frame, where the open electrical circuit C1 comprises spring mounted contact points at the bottom of the holes as part of the first and second electrical contact 21, 31 providing a good electrical contact to the cylindrical conductive areas 41, 42 of the seal 4, which could be for example metal pins or pins covered by a metal layer. In other embodiments, the shape of the first and second electrical contact and conductive areas may deviate from a cylindrical shape. As an example, the shape of the cross section of the hole might be the rectangular, oval, hexagonal or any other shape. Also, the depth of the holes or recesses might be different as well as the dimensions of the protruding first and second conductive areas 41, 42. The first and second electrical contact might be arranged as plug-ins or recesses for first and second conductive areas shaped as corresponding sockets or protrusions. Alternatively, the first and second electrical contact 21, 31 and/or the first and second conductive areas 41, 42 might be arranged at the surface of seal, door and door frame and being magnetic, as shown as an example in FIG. 2*b*. In this case, the shapes of first and second electrical contact and conductive areas do not have a shape adapted to each other as long as the magnetic force between the contact points is strong enough to fix the seal 4 to door 2 and door frame 3. People skilled in the art may choose other suitable shapes or properties of first and second electrical contact and conductive areas to obtain a seal fixed to the door and the door frame within the scope of this invention. The seal 4 comprises a body, where the first and second conductive areas are connected via an electrical connection C2 either through the body or via a conductive path on top of the surface of the seal 4. The seal 4 (or the door 2 or the door frame 3) may further include a lighting unit 43 (e.g. a LED) to indicate the activation A of the indicator 6, which is arranged within the closed electrical circuit C established by contacted circuits C1 and C2. The indicator can be arranged (a) within the electrical circuit C1 within door and door frame or (b) within the electrical circuit C2 of the seal 4. People skilled in the art may choose the location of the indicator 6 according to the particular application of the subject innovation. The indicator 6 may include a sender 61 to send-out a warning signal 62 in case of a broken electrical circuit C, which was closed formally. A power source 8 might be arranged within the electrical circuit C to operate the indicator 6 and the sender 61, either inside the seal or in the electrical circuit C1. The indicator 6 may provide a machine-readable code M in order to identify the sealed door 2. Alternatively, such a machine-readable code M might be attached to the surface of the seal 4, e.g., as a barcode label. The arrow S indicates the direction of attaching the seal to door and door frame.

Figure 3:
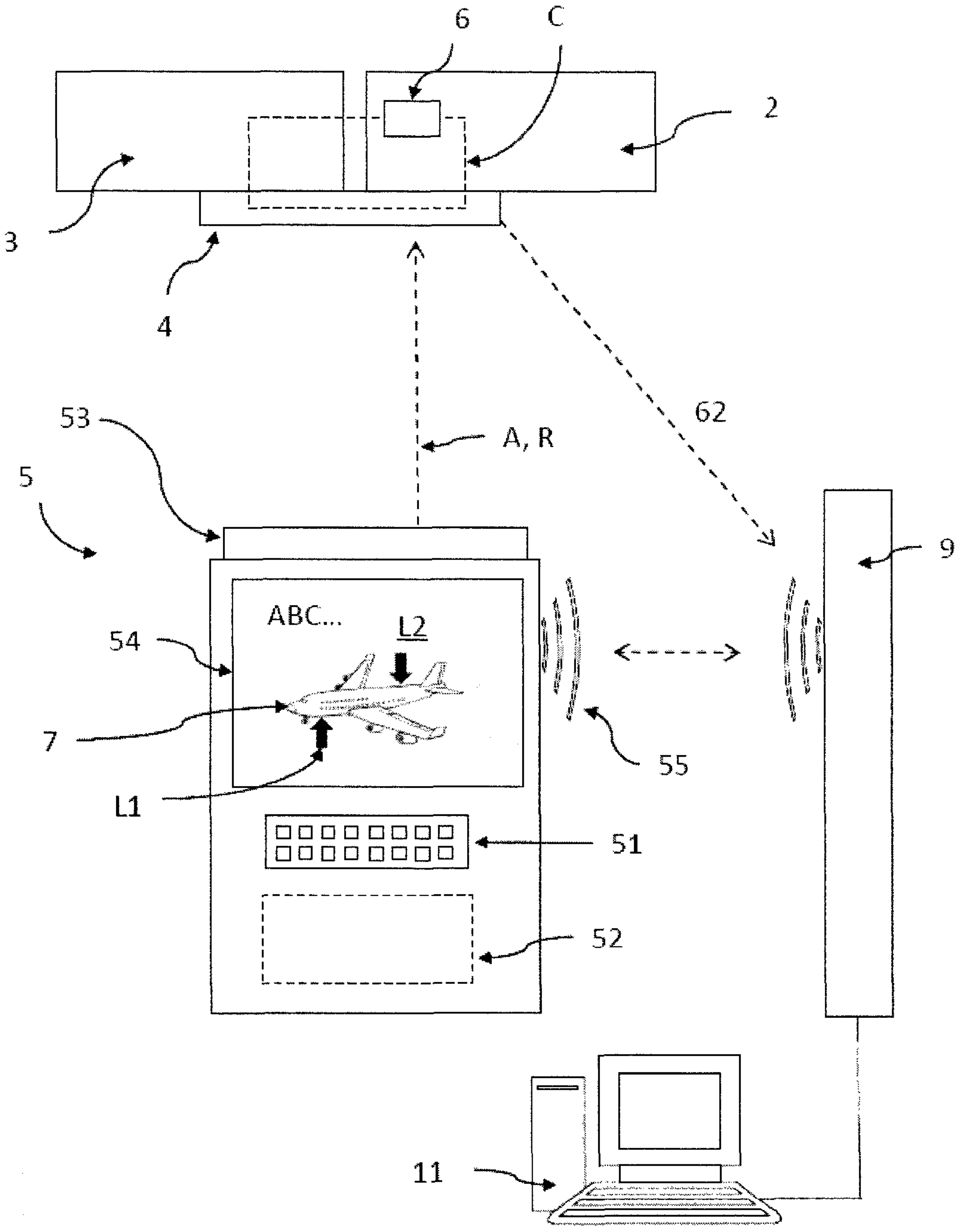
FIG. 3 is embodiments of a seal and a portable logging device connected to a receiving station and a computer system.

FIG. 3 shows a portable logging device 5, e.g., shaped as a hand-held scanner, to record the sealing of doors 2. The portable logging device 5 includes a data insert unit 51 to insert a particular type of the transport vehicles 7 (here displayed as "ABC . . . " in the display unit 54) and to insert the executed attachment of a seal 4 as well as a data unit 52 to store the inserted data. For example, the data unit 52 could be a storage chip or a storage card permanently or reversibly mounted to the portable device 5. The data insert unit 51 could be any suitable array of buttons or keys suitable to insert the required data. Here the data insert unit 51 is a small key board. The portable logging device 5 includes a display unit 54 to display the location of the doors 2 to be sealed with seals 4. As an example, an aircraft is displayed as the transport vehicle 7, where the two doors (in this particular example) are indicated with bold arrows L1, L2 to support the operator executing the sealing procedure, where the seals 4 are attached. After attaching a seal 4 to a door 2 and the corresponding door frame 3 at a location L1, the portable logging device 5 reads R the machine-readable code of the indicator 6 of the particular closed electrical circuit C with a reading unit 53 and stores the machine-readable code in the data unit 52. The code of the indicator 6 is now correlated to the particular door (location L1 as an example), where the seal is attached. The correlated data of seal and location improves the inspection procedure in case of re-opened doors and also improves the logging of the sealing procedure and simplifies the archiving of the data of each sealing procedure. The portable logging device 5 further includes a data connection unit 55 to transfer the data (identification code of the seal correlated to a certain location of the door, type of the transport vehicle and optional administrative data such as attaching time etc.) to a computer system 11. The data connection further allows to up-date the data stored in the data unit 52. The data connection 55 may be a wireless data connection, where the data is received by a receiving station 9 also able to receive a warning signal 62 in case of a broken electrical circuit C and transmitted to the computer system 11 by another data connection, e.g., a data cable. Alternatively, the data connection could be a data port unit able to be inserted in a corresponding plug-in unit to connect the portable logging device 5 to the computer system 11. In other embodiments, it could be possible to active A the seal 4 with the portable logging device 5 sending out an activation signal A as indicated by the dashed line. The same or other receiving stations 9 as used for establishing the data connection to the portable logging device 5 can be used to receive the warning signal 62 from the seal 4 in case of a re-opened door 2.

Figure 4:
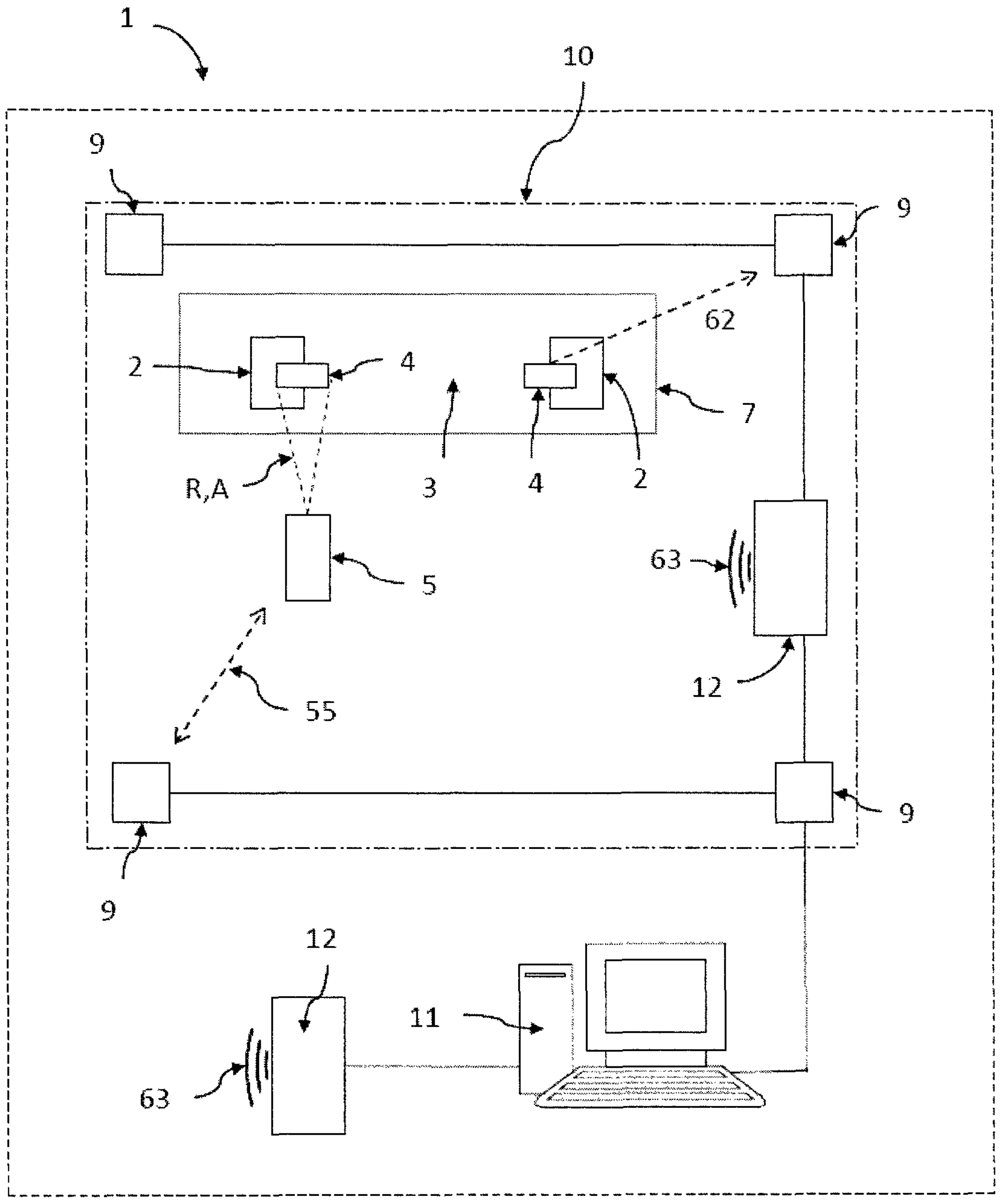
FIG. 4 is a sealing system according to the present invention.

FIG. 4 shows an embodiment of a sealing system 1 according to the subject innovation. Here, the schematically indicated transport vehicle 7 includes two doors 2, both doors 2 are sealed with attached seals 4. The portable logging device 5 is used to read R the machine readable code provided by the indicator (not shown here in detail) after activation A of the indicator in order to start controlling the status of the door 2. The transport vehicle 7 is located in a clearance area 10 as part of a logistic terminal or logistic center, e.g. an airport, a station etc. further comprising four receiving stations 9 suitable to receive the sealing data transmitted from the portable device 5 in order to record the sealing procedure and to receive a warning signal 62 in case of a damaged or detached seal 4 and subsequently broken closed electrical circuit from any location inside the clearance area 10. The sealing data and/or the warning signal 62 are transmitted from the receiving station 9 to the connected computer system 11, where the sealing data are archived. The sealing data can be re-checked in case of doubts for any performed sealing procedure. The check proves the accurate execution of the sealing procedure without the necessity to repeat the sealing procedure manually, which saves clearance time. In case of a received warning signal 62, the computer system 11 provides an alarm signal 63 via an alarm 12 (e.g. loudspeakers etc.) at least inside the clearance area 10, preferably also to security operators located outside the clearance area 10.

Figure 5:
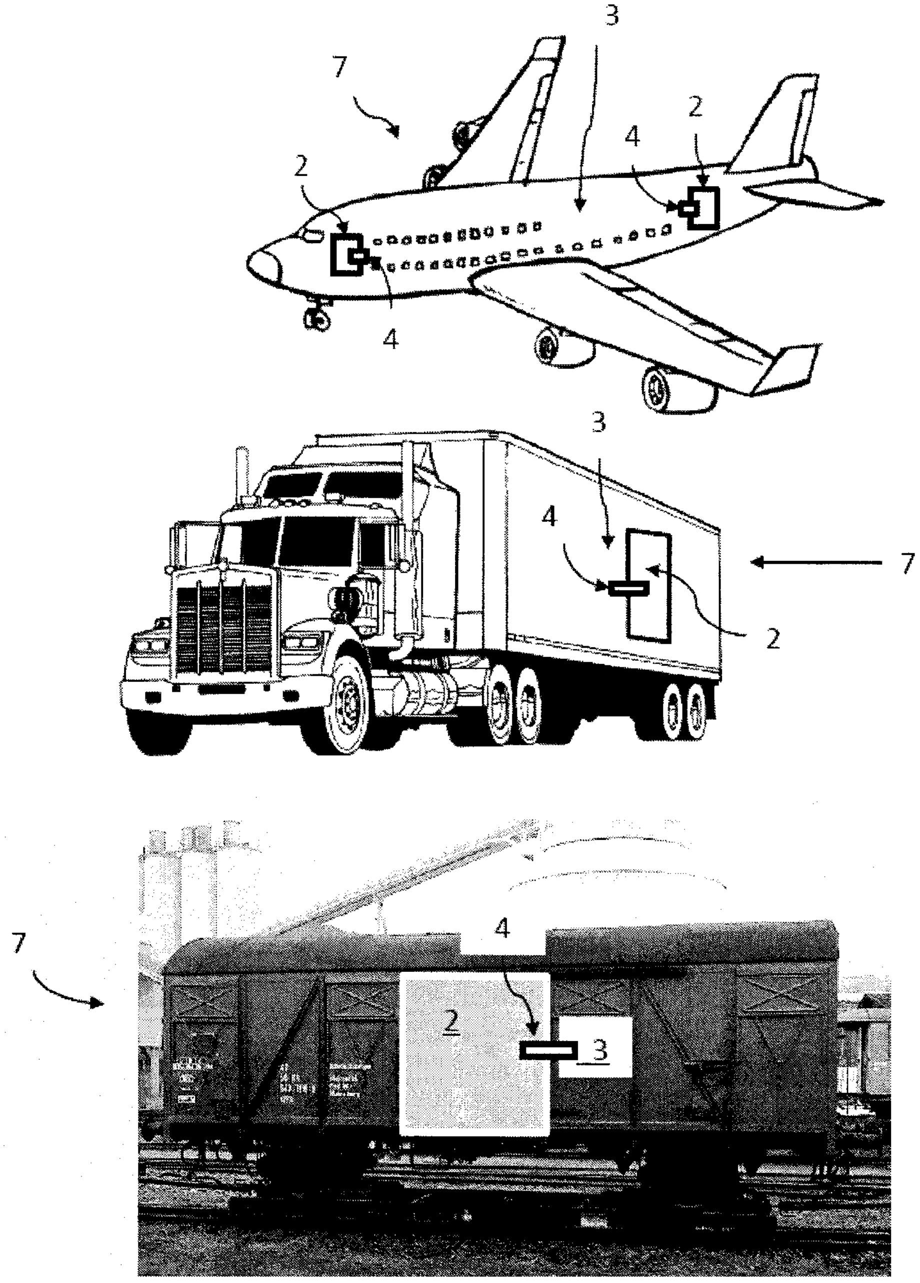
FIG. 5 is different transport vehicles with applied sealing system according to the present invention.

FIG. 5 shows three examples of transport vehicles 7, where the sealing system, the seal 4 and the portable logging device can be applied to, e.g. an airplane, a truck or a train wagon. The application of the seal 4, the portable device, the sealing system and the sealing method to other transport vehicles 7 with doors 2 and door frames 3 is also covered by the subject innovation.

While the invention has been illustrated and described in details in the drawings and foregoing description, such illustration and description are to be considered illustrative or exemplary and not restrictive; the invention is not limited to the disclosed embodiments.

Other variations to the disclosed embodiments can be understood and effected by those skilled in the art in practicing the subject innovation, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference sign in the claims should not be construed as limiting the scope.

What is claimed is:

1. A sealing system for sealing of doors of transport vehicles comprising at least one door with at least one first electrical contact means and a corresponding door frame with at least one second electrical contact means, where the first and the second contact means are arranged on a same side of the door and the door frame and are electrically connected via door, door hinge and door frame to build an open electrical circuit, and a seal to be attached to the door and the door frame suitable to close the open electrical circuit between the first and second electrical contact means in order to indicate sealing of the door, further comprising at least one portable logging device to record sealing the door with at least a data insert unit to insert a particular type of the transport vehicles, a display unit supporting an operator to find the doors for later execution of sealing, where the display unit displays a location of each door of the particular type of the transport vehicle wherein the seal has to be attached, wherein the location is displayed as a marker on a displayed lay-out or blueprint of the transport vehicle, the data insert unit to record an executed attachment of the seal to the door, and a data unit to store the data as sealing data, where the open electrical circuit comprises spring mounted contact points at adapted holes as part of the first and second electrical contact means providing an electrical contact to a first and a second conductive areas of the seal.

2. The sealing system of claim 1, wherein an indication means is arranged within the closed electrical circuit in or on the seal, and being activated by closing the open electrical circuit, to detect a break of a closed electrical circuit during an activated status of the indication means.

3. The sealing system of claim 2, wherein a power supply is arranged within the closed electrical circuit in order to operate at least the indication means.

4. The sealing system of claim 2, wherein the indication means comprises a sending means suitable to send out a warning signal in response to the detected break of the closed electrical circuit.

5. The sealing system of claim 4, further comprising at least one receiving station arranged within a clearance area to receive the warning signal.

6. The sealing system of claim 5, further comprising a machine-readable code suitable to identify the certain door, wherein the portable logging device comprises a reading unit suitable to read the machine-readable code and to store the machine-readable code as part of sealing data in the data unit.

7. The sealing system of claim 6, comprising a computer system suitable for receiving and storing the sealing data from the portable logging device.

8. The sealing system of claim 6, wherein the machine-readable code is a barcode label glued on a surface of the seal facing away from the door.

9. The sealing system of claim 8, where the first and second electrical contact means and the first and second conductive areas are arranged at the surface of the seal, door and door frame and are magnetic providing a magnetic force strong enough to fix the seal to the door and door frame.

10. The sealing system of claim 5, where the receiving station further comprises alarm means suitable to provide an alarm signal at least inside the clearance area as a response of the received warning signal.

11. The sealing system of claim 4, wherein the sending means, is a RFID chip.

12. The sealing system of claim 4, wherein the send out warning signal comprises a code suitable to identify a location of a sealed door.

13. The sealing system of claim 1, where the portable logging device is adapted to provide number of doors to be checked for this particular transport vehicle after having inserted the type of the transport vehicle into the data insert unit of the portable logging device.

14. The sealing system of claim 1, where the portable logging device is adapted to count a number of executed attachments of seals and compares the number with an expected and to be check number of doors for this particular type of transport vehicle.

15. A method for operating a sealing system, comprising:

providing at least one door with at least one first electrical contact means and a corresponding door frame with at least one second electrical contact means, where the first electrical contact means and the second electrical contact means are arranged on a same side of the at least one door and corresponding door frame, and are electrically connected to build an open electrical circuit via door, door hinge and door frame;

providing at least one portable logging device to record sealing the door with at least a data insert unit, a data unit and a display unit;

inserting a particular type of a transport vehicle into the data insert unit of the portable logging device;

displaying a location of each door of the particular type of the transport vehicle where the seal has to be attached in the display unit, where the location is displayed as marker on a displayed lay-out or blueprint of the transport vehicle;

followed by closing the open electrical circuit by attaching a seal to the first electrical contact means of the door and to the second electrical contact means of the door frame in order to indicate sealing the door where the open electrical circuit comprises spring mounted contact points at adapted holes as part of the first and second electrical contact means providing an electrical contact to a first and a second conductive areas of the seal;

recording an executed attachment of the seal to the door with the data insert unit; and storing the data as sealing data in the data unit.

16. The method of claim 15, wherein closing the open electrical circuit comprises:

activating an indication means after or by attaching the seal; and sending out a warning signal by the indication means after detecting a break of the closed electrical circuit during an activated status of the indication means.

17. The method of claim 16, comprising:

receiving the warning signal with at least one receiving station arranged within a clearance area; and providing an alarm signal at least inside a clearance area as a response of the received warning signal.

* * * * *